(12) United States Patent
Klosterman et al.

(10) Patent No.: US 6,538,763 B1
(45) Date of Patent: Mar. 25, 2003

(54) PRINTER DRIVER ARCHITECTURES AND METHODS OF PROVIDING ADAPTABLE PRINTER DRIVER ARCHITECTURES

(75) Inventors: Elliot Lee Klosterman, Boise, ID (US); John P. Daly, Eagle, ID (US); Philip C. Verghese, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/300,748

(22) Filed: Apr. 26, 1999

(51) Int. Cl.$^7$ ................................................ G06K 15/00
(52) U.S. Cl. ...................................... 358/1.15; 358/1.1
(58) Field of Search ................................. 358/1.1, 1.13, 358/1.15, 1.16, 1.18, 1.6, 442; 400/3, 61, 62, 67, 70, 76; 710/10, 11, 8, 62, 72

(56) References Cited

U.S. PATENT DOCUMENTS

| 5,243,691 A | * | 9/1993 | Kuwabara et al. ......... 358/1.13 |
| 5,580,177 A | | 12/1996 | Gase et al. .................... 400/61 |
| 5,687,301 A | | 11/1997 | Stokes et al. ................ 395/112 |

\* cited by examiner

*Primary Examiner*—Arthur G. Evans (57) ABSTRACT

Printer driver architectures and methods of providing adaptable printer driver architectures are described. In one embodiment, a printer driver architecture includes a kernel which is configured to implement printer driver functionalities. At least one interface is provided into the kernel which is configured to permit addition and incorporation of at least one operation-specific functionality, which is not specifically provided by the kernel's printer driver functionalities. In another embodiment, a kernel is defined and configured to implement printer driver functionalities. A plurality of interfaces are defined in the kernel and are configured to permit addition and incorporation of various operation-specific functionalities which are not specifically provided by the kernel's printer driver functionalities. At least one operation-specific functionality is interfaced through at least one of the defined interfaces in the kernel to provide a printer driver functionality that the kernel would not otherwise have. In yet another embodiment, an abstract base class is defined which pertains to at least one operation-specific functionality of a printer driver. The abstract base class is used to define an abstract interface. The abstract interface is defined for a hierarchy of classes pertaining to the at least one operation-specific functionality. The abstract base class is capable of implementing at least some, but not all of the interface it defines. At least one class is derived from the base class which implements all unimplemented portions of the abstract interface.

20 Claims, 5 Drawing Sheets

PRINTER DRIVER ARCHITECTURES AND METHODS OF PROVIDING ADAPTABLE PRINTER DRIVER ARCHITECTURES

FIELD OF THE INVENTION

This invention relates to printer driver architectures and to methods of providing adaptable printer driver architectures.

BACKGROUND OF THE INVENTION

Print drivers are generally known and enable a processor, such as a personal computer, to configure an output data stream that will be recognized and acted upon by a connected printer. The output data stream implements necessary hand-shaking actions required to enable interaction between the processor and the connected printer. Processors such as personal computers require an operating system such as Windows 3.1, Windows 95, Windows NT or DOS (Disk Operating System) in order to operate correctly. Because of various differences between these different types of operating systems, printer drivers which are configured for use with one operating system often cannot be used with another operating system. In addition, various other differences in a printer's operating environment can cause printer drivers to not be "transparent". In other words, a completely different printer driver can be, and often is required. Some of the differences in a printer's operating environment include differences in Page Description Languages (i.e. the specific languages used to describe a particular collection of data which is to be printed and which is understood by a printer), printer models, and User Interfaces (UI), to name just a few.

In the past, solutions to the various problems foisted upon printer drivers, e.g. operating environment differences, have involved using different software code bases for printer drivers for the different operating systems, Page Description Languages, and the like. These solutions have been largely monolithic implementations with little or no substitutability of shared implementations. Resultingly, printer drivers have been hard to maintain and hard to migrate to other different operating systems and/or printer platforms. Additionally, the different solutions have resulted in a different look and feel to the driver UI, as well as differing driver behaviors depending on the code base. Aspects of various printer drivers are described in U.S. Pat. Nos. 5,687,301 and 5,580,177, the disclosures of which are incorporated by reference.

The invention arose out of concerns associated with providing improved printer driver architectures and methods of providing printer driver architectures.

SUMMARY OF THE INVENTION

Printer driver architectures and methods of providing adaptable printer driver architectures are described.

In one embodiment, a printer driver architecture includes a kernel that is configured to implement printer driver functionalities. At least one interface is provided into the kernel that is configured to permit addition and incorporation of at least one operation-specific functionality which is not specifically provided by the kernel's printer driver functionalities.

In another embodiment, a kernel is defined and configured to implement printer driver functionalities. A plurality of interfaces are defined in the kernel and are configured to permit addition and incorporation of various operation-specific functionalities which are not specifically provided by the kernel's printer driver functionalities. At least one operation-specific functionality is interfaced through at least one of the defined interfaces in the kernel to provide a printer driver functionality that the kernel would not otherwise have.

In yet another embodiment, an abstract base class is defined and pertains to at least one operation-specific functionality of a printer driver. The abstract base class is used to define an abstract interface. This interface is defined for a hierarchy of classes pertaining to at least one operation-specific functionality. The abstract base class may implement some part but not all of the interface it defines; at least one concrete class is derived from the abstract base class. The derived class implements all unimplemented portions of the interface.

DETAILED DESCRIPTION OF THE INVENTION

OVERVIEW

Figure 1:
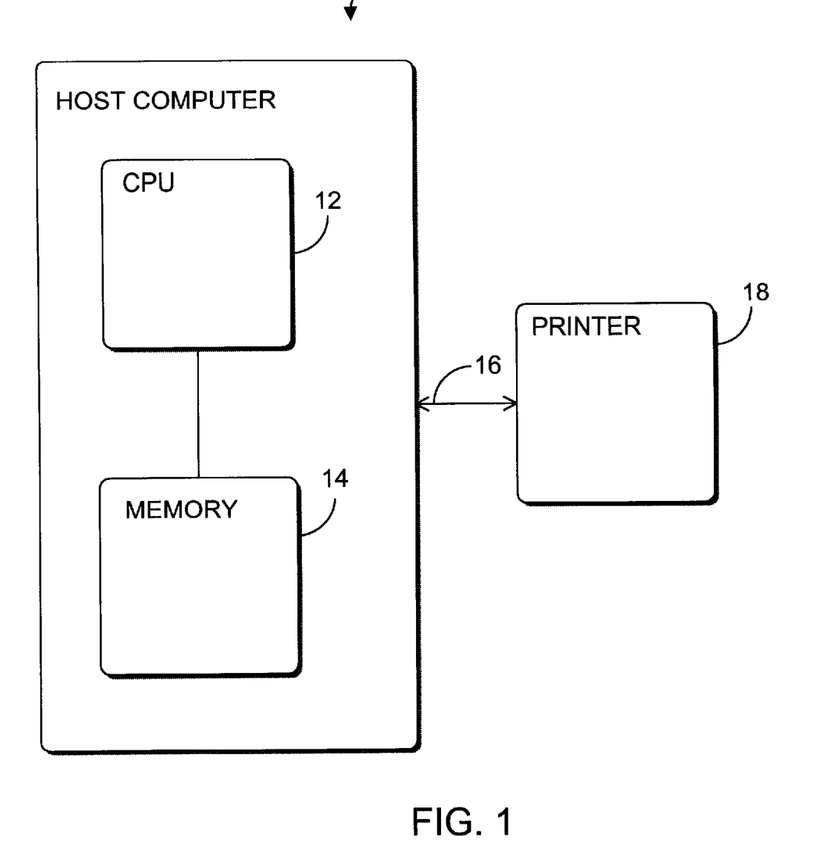
FIG. 1 is a high-level block diagram view of a host computer and printer that can be used in the implementation of one or more embodiments of the present invention.

FIG. 1 shows a host computer generally at 10 that includes a CPU 12 and memory 14. Memory 14 comprises standard ROM and RAM portions that are not specifically designated. Memory 14 contains software code for controlling various applications on the host computer. Such software code can, and preferably does include a printer driver application. In one or more of the embodiments described just below, the inventive printer driver applications or architectures are provided in memory 14 and are executable on CPU 12. It will be appreciated, however, that various embodiments of the present invention can reside on computer-readable media, e.g. hard disk, floppy disk, CD-ROM, etc., in the form of computer-executable instructions which, when executed by a computer, cause a computer to operate in the various manners described below. This computer-readable media can be located anywhere, and not necessarily within host computer 10. An I/O interface 16 is provided and permits host computer 10 to communicate with a printer 18. Printer 18 is configured to receive print commands from the host computer and, responsive thereto, render a printed media. Various exemplary printers include laser printers that are sold by the assignee of this document.

As used in the context of this document, the term "operation-specific functionality" will be understood to include the specific functionalities and behaviors which arise from and which can be unique to different operating systems, Page Description Languages (PDLs), printer models, and User Interfaces (UIs). These four exemplary operation-specific functionalities are not intended to limit the invention in any way to the specifically discussed and described functionalities. As such, other functionalities can be employed in the context of one or more embodiments of the invention without departing from the spirit and scope of the present invention.

The various embodiments discussed just below were developed to preferably provide a printer driver architecture that is independent of the various operation-specific functionalities, i.e. operating systems, PDLs, printer models, and UIs. These solutions were driven by the need to be able to reduce the amount of software code needed to implement the printer drivers for various operating systems and PDLs used in a wide variety of printers. The need or desire to provide extendibility and/or added driver functionality in a simple and direct manner also drove these solutions. For example, in various embodiments of the invention, third party developers who sell add-on products to printer products can now have the ability to hook functionality into the driver itself, without having the driver source code.

In preferred embodiments of the invention, Object Oriented Programming (OOP) techniques are used and code is provided using the programming language C++. It will appreciated, though, that various embodiments of the invention need not necessarily be implemented through OOP techniques. OOP techniques, however, carry with them added advantages of modularity and re-use of code that can greatly facilitate a programmer's job.

PRINTER DRIVER ARCHITECTURE

Figure 2:
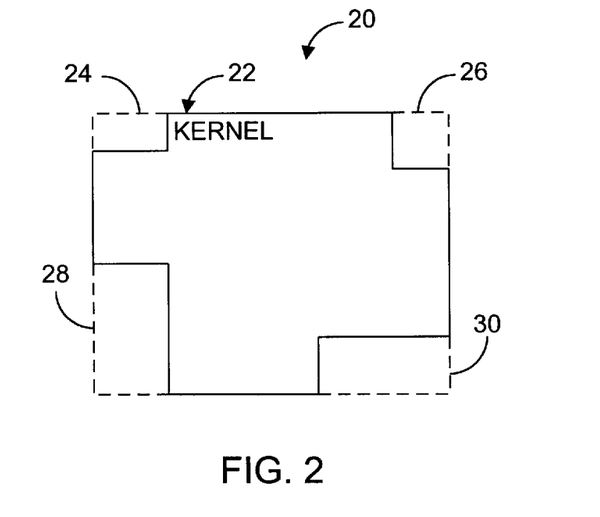
FIG. 2 is a conceptual modeling diagram that is useful in understanding one or more embodiments of the present invention.

FIG. 2 shows a conceptual modeling diagram of a printer driver architecture in accordance with one or more embodiments of the invention generally at 20. In the illustrated example, the printer driver architecture comprises a kernel 22 that is configured to implement various printer driver functionalities. The kernel of the architecture is where the bulk of tasks common to print drivers are executed and where elements to support the basics of the architecture are found. Its role is to accomplish as much of the printer driver responsibility as possible in an OS, PDL, and model independent manner. A particular driver implementation with its specific functionality utilizes the kernel code elements to do its work. The kernel is what the specific functionality elements tie to in order to form a complete architectural implementation. Those of skill in the art will understand the various printer driver functionalities that kernel 22 can implement. Such other functionalities include managing the state of the driver during printing, making callbacks to the OS, PDL, or model specific layers to retrieve specific information, processing configuration changes reported by status tools or requested from the UI, and performing load balancing to achieve optimal printing performance, etc. At least one interface is provided in kernel 22. The term "interface" as used in this document will be understood to include any mechanism, whether implemented in hardware, software, or firmware, which enables or permits the addition and incorporation of at least one operation-specific functionality which is not specifically provided by the kernel's printer driver functionalities. In the illustrated example, four exemplary interfaces are provided at 24, 26, 28, and 30. It will be understood, however, that any number of interfaces can be provided. The illustrated conceptual model can be considered as analogous to a puzzle. Kernel 22 provides the functionality of a printer driver, with the pieces of the puzzle, e.g. 24, 26, 28, and 30 giving the puzzle functionality it would not otherwise have. To this end, modularity is achieved with added degrees of flexibility which, heretofore, were difficult and complicated to achieve. This will become more apparent as consideration is given to the description below.

Operating System Interface

Figure 3:
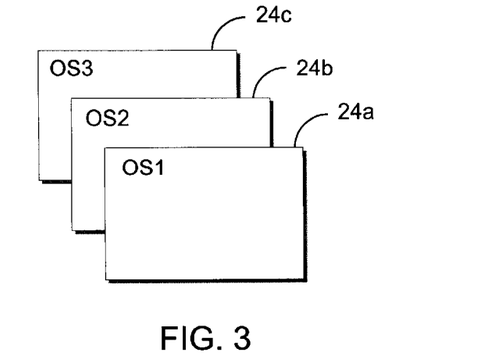
FIGS. 3–6 are expansions of the FIG. 2 conceptual modeling diagram that illustrate various implementations of the present invention.

Interface 24 is preferably configured to permit the addition and incorporation of an operation-specific functionality that relates to at least one, and preferably a plurality of operating systems. Exemplary operating systems are shown in FIG. 3 and designated as OS1 (24*a*), OS2 (24*b*), and OS3 (24*c*) for operating system 1, operating system 2, and operating system 3 respectively. Exemplary operating systems can include, but are not limited to Windows 3.1, Windows NT, and OS/2. Each of these operating systems is different. Accordingly, each generates a somewhat different print request. The interface 24 permits the operating system-specific print request to be modified into a form that is better understood by kernel 22. In this example, the operating system-specific print request is modified into a meta-language understood by kernel 22. Preferably, the modification of the operating system-specific print request takes the form of a representation (object) which is independent of the operating system that rendered the print request. Accordingly, the interface provides modularity which enables print requests from different operating systems to be processed with uniformity, as long as there is conformity with the interface. The modified operating system-specific print request (object) can now be processed through the kernel through well-defined programmatic interfaces.

User Interface

Figure 4:
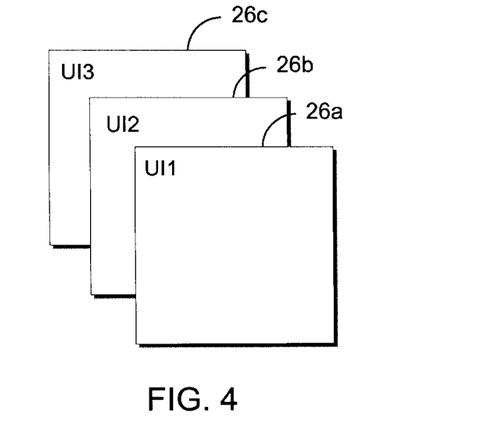

Interface 26 is preferably configured to permit the addition and incorporation of an operation-specific functionality that relates to at least one, and preferably a plurality of user interfaces. Exemplary user interfaces are shown in FIG. 4 and designated as UI1 (26*a*), UI2 (26*b*), and UI3 (26*c*) for user interface 1, user interface 2, and user interface 3, respectively. Each of these user interfaces is different. Accordingly, each behaves in a somewhat different manner. The interface 26 permits each user interface to communicate in a modular, uniform fashion with kernel 22.

Page Description Language Interface

Figure 5:
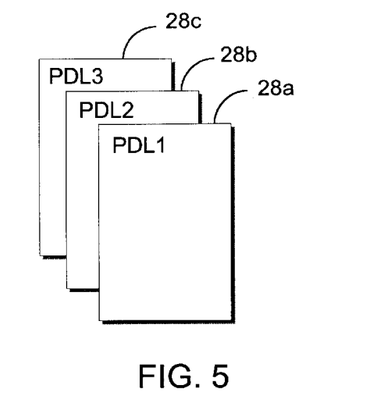

Interface 28 is preferably configured to permit the addition and incorporation of an operation-specific functionality which relates to at least one, and preferably a plurality of Page Description Languages (PDLs). Exemplary PDLs are shown in FIG. 5 and designated as PDL1 (28*a*), PDL2 (28*b*), and PDL3 (28*c*) for Page Description Language 1, Page Description Language 2, and Page Description Language 3, respectively. Exemplary PDLs can include, but are not limited to PCL 5, PCL 6, and Postscript. The PDLs receive objects (print requests) passed through kernel 22 via a well-defined interface. The PDLs can then take the requests and convert them to a stream of commands that the printer's graphics language needs to actually print the desired graphics and/or text on a hard copy page in the physical printer.

Printer Model Interface

Figure 6:
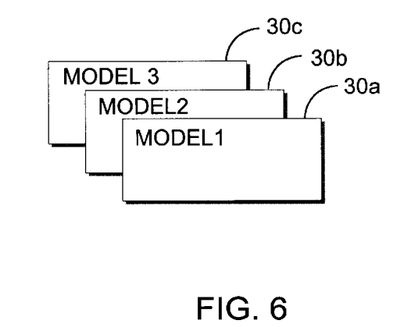

Interface 30 is preferably configured to permit the addition and incorporation of an operation-specific functionality that relates to at least one, and preferably a plurality of printer models. Exemplary printer models are shown in FIG. 6 and designated as Printer Model 1 (30a), Printer Model 2 (30b), and Printer Model 3 (30c). Each of these printer models can be quite different in the way print requests are handled. In one implementation, the interface between the model-based specific functionality is through an extensible data structure reporting the capabilities and attributes of the printer model the driver is supporting. This data structure is parseable by the kernel code so that the kernel can be configured to be operated according to the model's properties. More powerful implementations might actually use a functional interface to more fully abstract the model's data from the kernel. The printer model data structure originates with a PMD (printer model data) data file that is read in by the kernel code in response to new job creation for the driver.

Print Pipe

Figure 7:
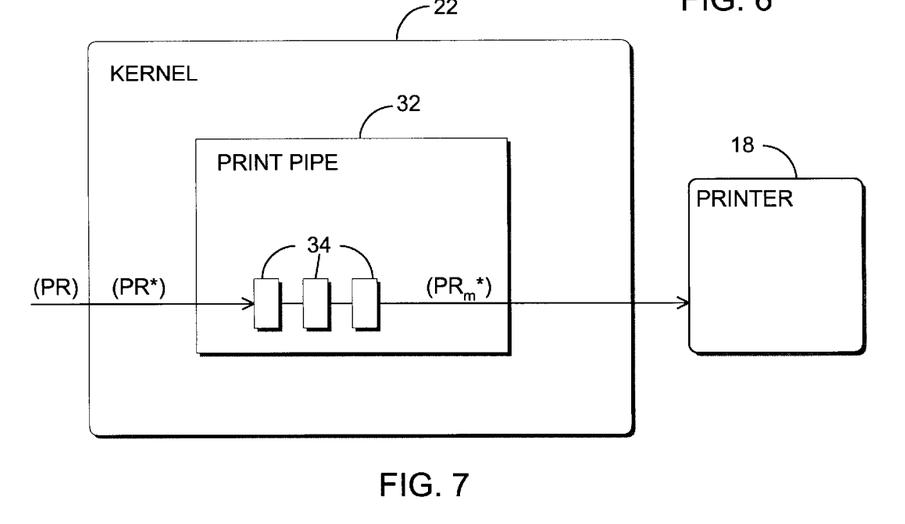
FIG. 7 is a high-level block diagram view of one embodiment of the present invention.

FIG. 7 shows kernel 22 in accordance with one embodiment of the invention. Preferably, features and functions are added to the print driver in kernel 22. For example, optional features like watermarks, n-up printing, booklet printing, and the like can be added in kernel 22 in a manner which is independent of the operation-specific functionalites, e.g. those which relate to operating systems and PDLs. By doing so, the implementation of these features need only be done once and can be reused for a wide range of drivers built for specific products. Specifically, and in accordance with a preferred embodiment of the invention, kernel 22 comprises a print pipe 32. Recall that kernel 22 is configured to translate a print request (indicated by Print Request PR) from a particular operating system into a kernel-specific request (PR*) or, in this example, an object. Print pipe 32 is configured to process the kernel-specific print request PR*. Print pipe 32 preferably includes a plurality of filters 34 through which the kernel-specific print request PR* is passed. Filters 34 constitute various feature implementations, e.g. water marks, n-up printing, booklet printing, and the like, which can be used to modify the kernel-specific print request PR* to provide a modified kernel-specific print request $PR_m^*$. This modified kernel-specific print request $PR_m^*$ or object is then passed to the PDL (not specifically shown in FIG. 7) via a well-defined interface between the kernel and the PDL piece.

Filter Changability

In one preferred embodiment, the filters 34 employ the use of interfaces that allow them to be interchangeably added to or removed from print pipe 32. In addition, filters that are already present in the print pipe can be preferably modified through the use of the defined interfaces. As such, driver developers can tailor the use of filters, i.e. features, in the print pipe as dictated by user needs. One particularly useful advantage of this embodiment is that independent software developers need not access the code that implements the particular printer driver. Rather, they only need to provide code that implements their particular features and that conforms to the appropriate interfaces.

The use of an architecture as described above can enable a considerable reduction in the amount of code that must be written and maintained for the wide range of driver needs. In addition, high levels of consistency can be achieved across printer driver and printer product lines.

ADAPTABLE PRINTER DRIVER METHODS

The various methods described just below are intended to illustrate various ways of providing printer drivers which are adaptable in the sense that changes can be made to the drivers which are independent of various operation-specific functionalities such as operating systems, PDLs, User Interfaces, and printer models. To this end, degrees of modularity can be achieved in a manner that does not require access to the underlying printer driver source code. Specifically, changes and modifications in the printer driver functionality can be made by providing only that portion of the driver that is desired to be changed. In preferred embodiments, software modules having conformed interfaces fit together, much like the pieces of a puzzle, so that printer driver functionality can be manipulated through the various different pieces of the puzzle.

Figure 8:
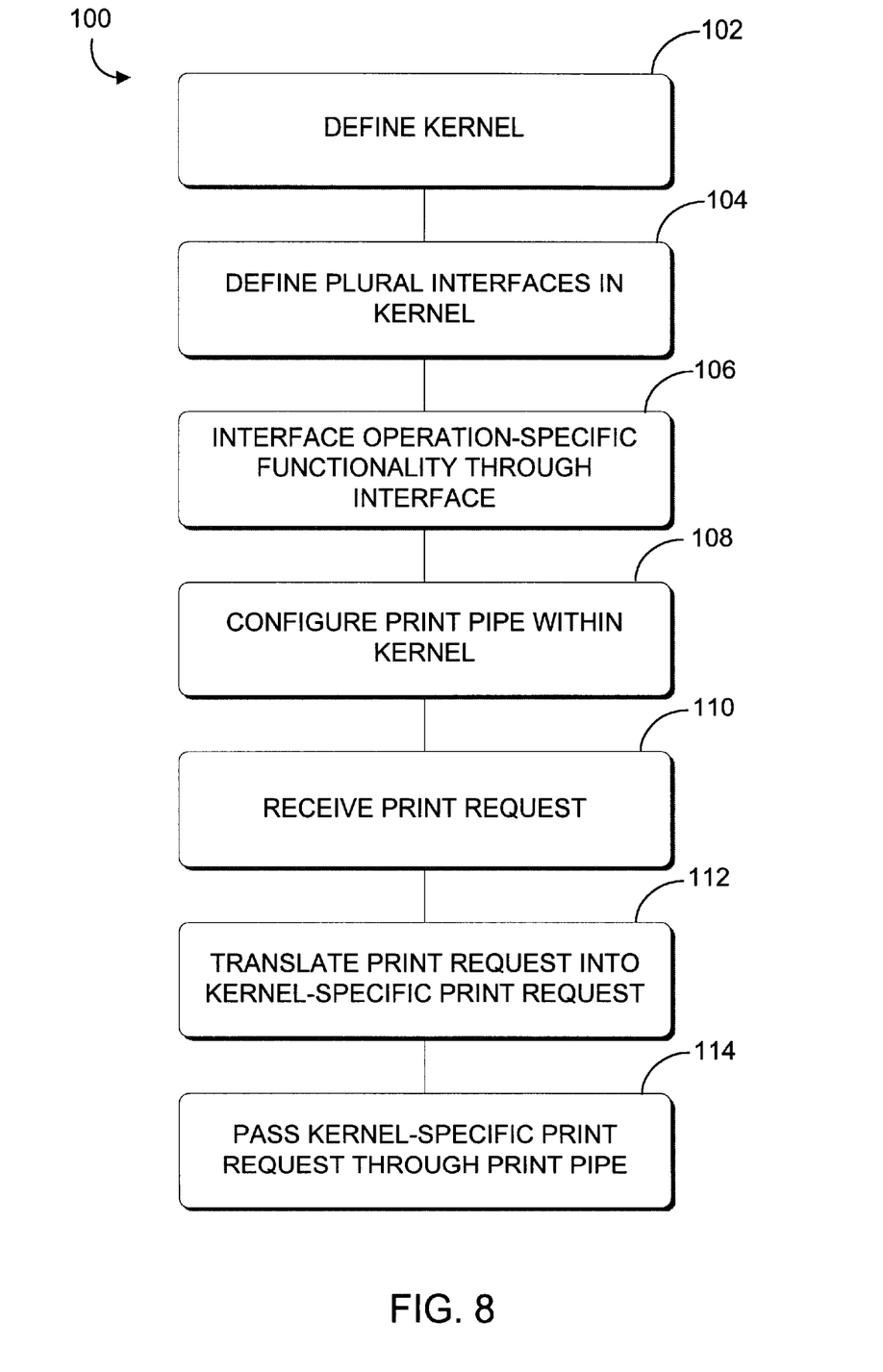
FIG. 8 is a flow diagram that illustrates certain methodical aspects of one or more embodiments of the present invention.

FIG. 8 shows a flow diagram generally at 100 that describes certain methodical steps in accordance with one or more embodiments of the present invention. It will be appreciated that the various steps can be implemented in any suitable hardware, software, or firmware.

At 102 a kernel, such as kernel 22 (FIG. 2) is defined. The kernel is preferably configured to implement printer driver functionalities. It is in the kernel where the bulk of the functionality for printer drivers is implemented. At 104, a plurality of interfaces are defined in the kernel and are configured to permit the addition and incorporation of various operation-specific functionalities which are not specifically provided by the kernel's printer driver functionalities. Examples of various operation-specific functionalities have been given above and include, without limitation, those relating to one or more of the following: operating systems, User Interfaces, Page Description Languages (PDLs), and printer models. At 106, at least one operation-specific functionality is interfaced through at least one of the defined interfaces in the kernel to provide a printer driver functionality that the kernel would not otherwise have.

In another embodiment, and as shown at 108, a print pipe, such as print pipe 32 (FIG. 7), is configured within the kernel and is configured to process kernel-specific print requests. Examples of kernel-specific print requests were given above. At 110 a print request, e.g. Print Request PR (FIG. 7) is received. The print request is preferably generated by a particular operating system. At 112, print request PR is translated with kernel 22 into a kernel-specific print request PR* (FIG. 7). At 114 the kernel-specific print request is passed through the print pipe in a manner which enables at least one of the filters to modify the kernel-specific print request to provide a modified kernel-specific print request $PR_m^*$ (FIG. 7). In various preferred embodiments, the kernel-specific print request is modified when it is passed through the print pipe.

In one preferred embodiment, the configuration of the print pipe which takes place at 108 includes the additional step of providing a mechanism by which filters can be added, removed, and/or modified. A preferred mechanism is an interface that has been described above.

Object Oriented Adaptable Printer Driver Methods

As indicated above, various embodiments of the invention are preferably implemented through the use of Object Oriented Programming Techniques and in the programming language C++. It is to be understood, however, that other programming techniques could be used without departing from the spirit and scope of the invention.

Figure 9:
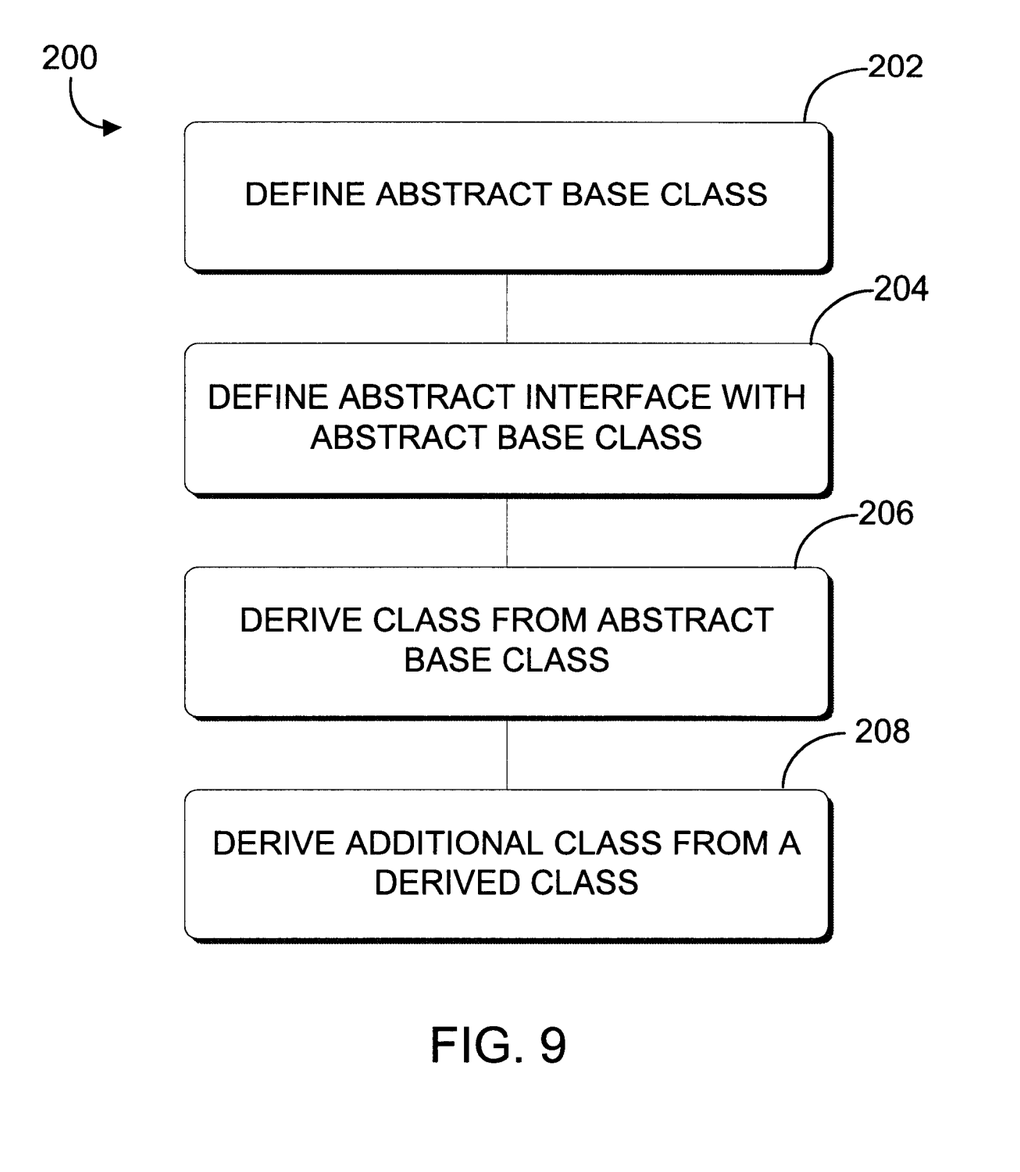
FIG. 9 is a flow diagram that illustrates certain methodical aspects of one or more embodiments of the present invention.

FIG. 9 shows a flow diagram generally at 200 that describes various methodical steps in accordance with various embodiments of the invention. At 202 an abstract base class is defined which pertains to at least one operation-specific functionality of a printer driver. Examples of operation-specific functionalities are described above and include, without limitation, those that relate to operating systems, Page Description Languages (PDLs), User Interfaces, and printer models. Other operation-specific functionalities can be incorporated as well. The abstract base class is used, at 204, to define an abstract interface. The abstract interface is defined for a hierarchy of classes pertaining to at least one, and preferably all of the operation-specific functionalities. The abstract base class is preferably capable of implementing at least some, but not all of the interface it defines. Such will become more apparent in the example given below. At 206, at least one class is derived from the base class. The derived class preferably implements all unimplemented portions of the abstract interface. In one preferred embodiment, and as shown at 208, at least one additional class is derived from a class that is derived from the base class.

EXAMPLE

To assist the reader in understanding the various embodiments of the invention described just above, the following example is given. The example is given in the context of an operation-specific functionality that relates to a Page Description Language. It will be understood, however, that this example can be translated into other operation-specific functionalities which do not necessarily include only those which are specifically discussed in this document.

Concepts that are utilized in Object Oriented Programming (OOP) which facilitate practice of the invention include the concepts of interface definition and derivation of classes from base classes. In C++, an interface can be defined in a base class, e.g. PDLClass, for a hierarchy of classes. These are often abstract base classes in the sense that at least one of the interfaces is not implemented by the base class, but rather must be implemented by a derived class. No instances of abstract base classes can be created-only instances of concrete derived classes can be created. However, by having classes derive from a particular base class and conform to the interface requirements described by that base class, derived classes (e.g. PCL5Class and PostScriptClass) can all be utilized as though they were of the base class (i.e. generic to PDLClass) type. By defining an adequately rich interface in the abstract base class, new classes derived for future use can be used. This is analogous to hooking a puzzle piece (e.g. PDLClass) into the kernel. The user of the class, in this example the kernel, only uses the standard interface defined for all PDLClass-derived classes.

Figure 10:
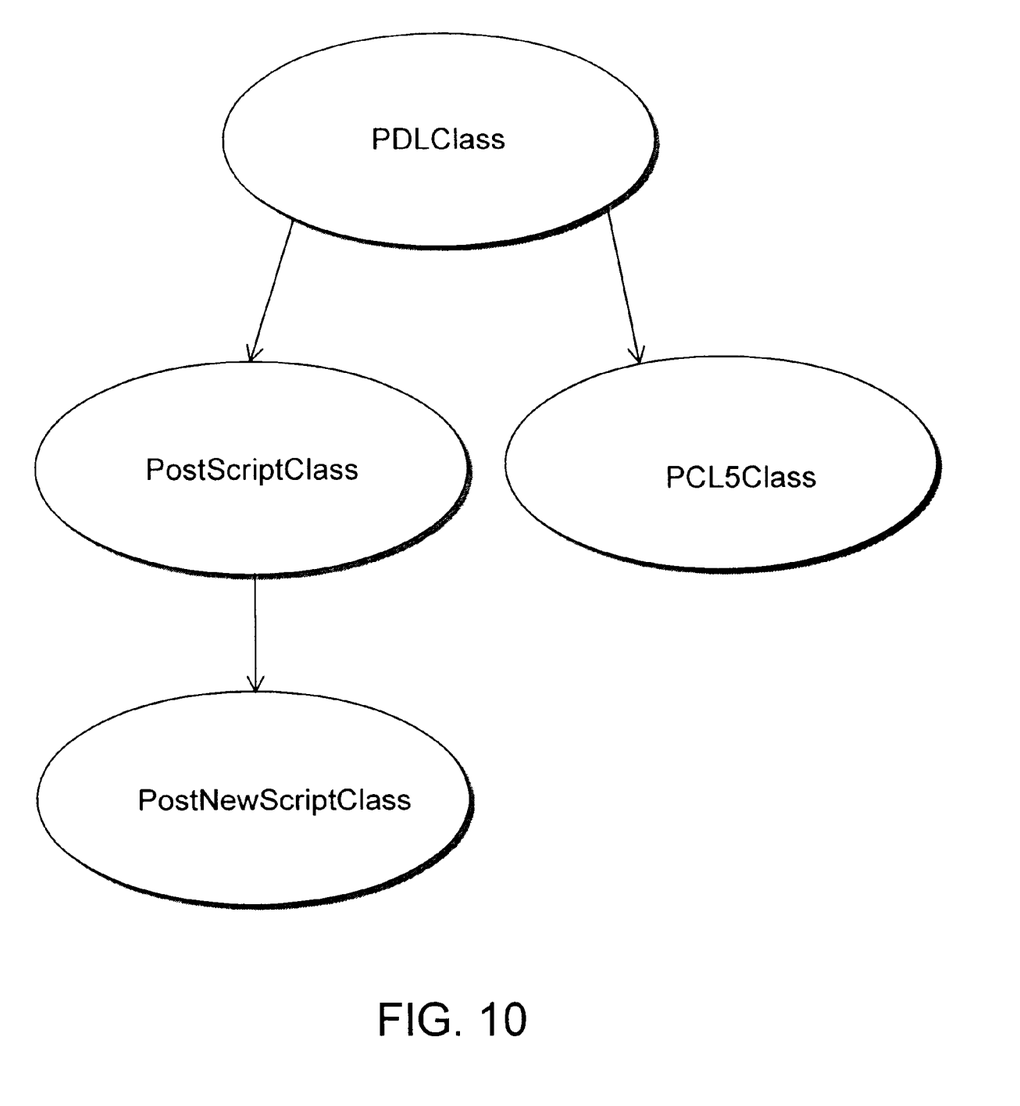
FIG. 10 is a diagram which illustrates the concept of a base class and derived classes in accordance with one or more embodiments of the invention.

Consider the following specific example with reference to FIG. 10. Assume that there are three PDL-related classes, e.g., the abstract base class (PDLClass), and two derived classes, PostScriptClass and PCL5Class. For simplicity, consider that the base class defines two interface methods, e.g. PrintRectangle and GetPDLCapabilities. Assume further that a default implementation for GetPDLCapabilities is defined in the base class, but that there is no definition for PrintRectangle. This tells us that PrintRectangle is a pure virtual method that, by definition, makes the base class abstract and impossible to create. This, in turn, means that any class that is derived from PDLClass must provide an implementation of PrintRectangle. Accordingly, each of the derived classes, PostScriptClass and PCL5Class, will implement the functionality expected by the kernel for PrintRectangle, but will perhaps do it quite differently. Even though the two derived classes do their tasks differently, they both look like a generic base PDLClass as far as their use is concerned.

OOP derivation of classes allows a software developer to derive a new class from a previously-derived class. The newly-derived class inherits all of the functionality of its base (previously-derived) class. One might derive the new class to replace one aspect of functionality of its parent class. Consider, for example, that in the future a newly-capable version of the PostScript graphics language in the printer becomes available. If this version of PostScript has a more efficient way of printing rectangles, a new PostScriptNewClass could be derived from the PostScriptClass. This means that, in general, the new class inherits all of the functionality of the old class. However, one can change just the way PrintRectangle works by implementing the more efficient method in the new class. This means that the new class has overridden the old class' implementation of PrintRectangle. Accordingly, only a small code change needs to be made to extend or replace a previous implementation. This is the basis of being able to extend the driver functionality within the original architecture that, in turn, greatly simplifies driver development. A more in depth discussion of OOP methods and, in particular, in concepts of interfaces, inheritances, and class derivation can be found in a text entitled "C++ Primer" $2^{nd}$ Edition, authored by Stanley B. Lippman, the disclosure of which is incorporated by reference.

The various embodiments of the invention described above provide an architectural framework which provides significant flexibility, consistency, and easy maintenance of code when producing printer drivers for a wide range of operating systems, Page Description Languages (PDLs), User Interfaces, and printer models. The ability to add features and functions to the driver, both from a third party perspective as well as an internal development perspective, in a way that does not require architectural change is a tremendous asset. Other advantages will be apparent to those of skill in the art.

Although the invention has been described in language specific to structural features and/or methodical steps, it is to be understood that the invention is defined in the appended claims is not necessarily limited to the specific features or steps described. Rather, the specific features and steps are disclosed as preferred forms of implementing the claimed invention.

What is claimed is:

1. A printer driver architecture comprising:
    a kernel configured to implement printer driver functionalities; and
    at least one interface in the kernel configured to permit addition and incorporation of at least one operation-specific functionality, which is not specifically provided by the kernel's printer driver functionalities.

2. The printer driver architecture of claim 1, wherein the at least one interface is configured to permit addition and incorporation of an operation-specific functionality relating to an operating system.

3. The printer driver architecture of claim 2, wherein the at least one interface is configured to permit addition and incorporation of an operation-specific functionality relating to a plurality of different operating systems.

4. The printer driver architecture of claim 1, wherein the at least one interface is configured to permit addition and incorporation of an operation-specific functionality relating to a Page Description Language (PDL).

5. The printer driver architecture of claim 4, wherein the at least one interface is configured to permit addition and incorporation of an operation-specific functionality relating to a plurality of different Page Description Languages (PDLs).

6. The printer driver architecture of claim 1, wherein the at least one interface is configured to permit addition and incorporation of an operation-specific functionality relating to a printer model.

7. The printer driver architecture of claim 6, wherein the at least one interface is configured to permit addition and incorporation of an operation-specific functionality relating to a plurality of different printer models.

8. The printer driver architecture of claim 1, wherein the at least one interface comprises a plurality of interfaces which are separately configured to permit addition and incorporation of operation-specific functionalities relating to a plurality of different operating systems, a plurality of different Page Description Languages (PDLs), and a plurality of different printer models.

9. The printer driver architecture of claim 1, wherein the kernel is configured translate a print request into a kernel-specific print request, and further wherein the kernel comprises a print pipe which is configured to process the kernel-specific print request, wherein the print pipe includes a plurality of filters each of which can modify the kernel-specific print request to provide a modified kernel-specific print request.

10. A method of providing an adaptable printer driver architecture comprising:

defining a kernel that is configured to implement printer driver functionalities;

defining a plurality of interfaces in the kernel, the interfaces being configured to permit addition and incorporation of various operation-specific functionalities which are not specifically provided by the kernel's printer driver functionalities; and interfacing at least one operation-specific functionality through at least one of the defined interfaces in the kernel to provide a printer driver functionality that the kernel would not otherwise have.

11. The method of claim 10, wherein the interfacing of the at least one operation-specific functionality comprises interfacing at least one operation-specific functionality relating to an operating system.

12. The method of claim 10, wherein the interfacing of the at least one operation-specific functionality comprises interfacing a plurality operation-specific functionalities relating to at least one of an operating system, a Page Description Language (PDL), a printer model, and a User Interface.

13. The method of claim 10 further comprising:

configuring a print pipe within the kernel which is configured to process kernel-specific print requests, the print pipe comprising a plurality of filters which can modify a kernel-specific print request;

receiving a print request;

translating the print request with the kernel into a kernel-specific print request;

passing the kernel-specific print request through the print pipe in a manner which enables at least one of the filters to modify the kernel-specific print request to provide a modified kernel-specific print request.

14. The method of claim 13 further comprising modifying the kernel specific print request when it is passed through the print pipe to provide a modified kernel-specific print request.

15. The method of claim 10 further comprising:

configuring a print pipe within the kernel which is configured to process kernel-specific print requests, the print pipe comprising a plurality of filters which can modify a kernel-specific print request; and configuring the print pipe in a manner which permits additional filters to be added.

16. The method of claim 10 further comprising:

configuring a print pipe within the kernel which is configured to process kernel-specific print requests, the print pipe comprising a plurality of filters which can modify a kernel-specific print request, the print pipe further being configured in a manner which permits additional filters to be added;

receiving a print request;

translating the print request with the kernel into a kernel-specific print request;

passing the kernel-specific print request through the print pipe in a manner which enables at least one of the filters to modify the kernel-specific print request to provide a modified kernel-specific print request.

17. A method of providing an adaptable printer driver architecture comprising:

defining an abstract base class which pertains to at least one operation-specific functionality of a printer driver, the abstract base class being used to define an abstract interface, wherein the abstract interface is defined for a hierarchy of classes pertaining to the at least one operation-specific functionality, wherein the abstract base class is capable of implementing at least some, but not all of the interface it defines; and deriving at least one class from the base class which implements all unimplemented portions of the abstract interface.

18. The method of claim 17, wherein the defining of the abstract base class comprises defining an abstract base class which pertains to an operation-specific functionality relating to at least one of an operating system, a Printer Description Language, and a printer model.

19. The method of claim 17 further comprising deriving at least one additional class from a class that is derived from the abstract base class.

20. The method of claim 17, wherein the defining of the abstract base class comprises defining an abstract base class which pertains to an operation-specific functionality relating to at least one of an operating system, a Printer Description Language (PDL), and a printer model; and further comprising deriving at least one additional class from a class that is derived from the abstract base class.

* * * * *